United States Patent [19]

Matsuda

[11] 4,254,353

[45] Mar. 3, 1981

[54] BRUSH HOLDER

[75] Inventor: Shinich Matsuda, Abiko, Japan

[73] Assignee: Mabuchi Motor Co., Ltd., Tokyo, Japan

[21] Appl. No.: 950,856

[22] Filed: Oct. 12, 1978

[30] Foreign Application Priority Data

Oct. 19, 1977 [JP] Japan .......................... 52/140293[U]

[51] Int. Cl.$^3$ ............................................. H02K 13/00

[52] U.S. Cl. ....................................... 310/239; 310/42

[58] Field of Search ................. 310/232, 40 MM, 244, 310/42, 89, 90, 242, 239, 247, 246, 245, 233, 248, 241, 238, 231, 229

[56] References Cited

U.S. PATENT DOCUMENTS

| | | | |
|---|---|---|---|
| 3,430,084 | 5/1969 | Hall | 310/242 |
| 3,444,409 | 5/1969 | Latta | 310/239 |
| 3,450,916 | 6/1969 | Mabuchi | 310/244 |
| 3,474,274 | 10/1969 | Groschopp | 310/242 |
| 3,714,481 | 1/1973 | Dijkstra | 310/244 |
| 4,112,321 | 9/1978 | Wan | 310/245 |
| 4,155,023 | 5/1979 | Hagenlocker | 310/246 |
| 4,157,483 | 6/1979 | Frimley | 310/229 |

FOREIGN PATENT DOCUMENTS

| | | | |
|---|---|---|---|
| 2438936 | 2/1976 | Fed. Rep. of Germany | 310/236 |

*Primary Examiner*—R. Skudy

[57] ABSTRACT

A holder for brushes that are adapted to engage a commutator of a motor includes an insulating brush arm mount having slits therein for receiving the arms of a conductive brush. The brush arm mount also includes first and second grooves for receiving a first ridge section of the brush arms and a second ridge section of a small case, respectively.

13 Claims, 14 Drawing Figures

BRUSH HOLDER

BACKGROUND OF THE INVENTION

The present invention relates to a brush holder for holding brushes opposite to a motor commutator and, more particularly, to a brush holder in which brush arm can be easily formed and which can hold the brush correctly in its proper position relative to the motor commutator and can be easily assembled.

Generally the motor case of a small-sized motor consists of a large case and a small case joined together, the large case being provided with fixed permanent magnets on its internal surface to form a motor stator, and the small case having a brush holder for holding brushes in the proper position relative to the motor commutator. The brush holder used in such a motor consists of brush arms each having a brush at its tip, a mount on which the brush arms are placed, and a part of the small case to which the brush arm mount is attached. However, the above-mentioned conventional brush holder has the disadvantage in that its brush arm becomes complicated in shape in order to firmly hold the brush and therefore requires troublesome forming operations.

SUMMARY OF THE INVENTION

It is therefore an object of the present invention to provide a brush holder which can eliminate the above-mentioned disadvantages of the prior art.

It is another object of the present invention to provide a brush holder which can be easily formed.

It is still another object of the present invention to provide a brush holder which can firmly hold its brush arm and can be easily assembled.

These and other objects and advantages of the invention will be best understood from the following detailed description taken in conjunction with the accompanying drawings wherein like reference numerals and characters designate corresponding parts throughout the views.

DETAILED DESCRIPTION OF THE PREFERRED EMBODIMENTS

Figure 1A:
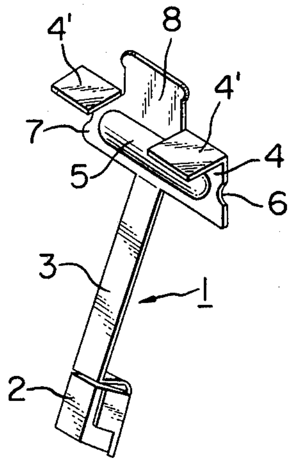
FIG. 1(A) is a perspective view of a brush arm according to a preferred embodiment of the present invention.
Figure 1B:
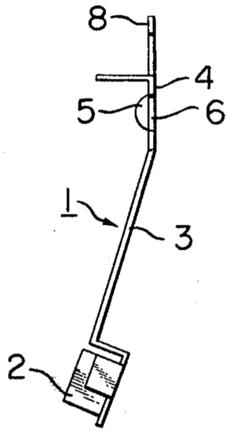
FIG. 1(B) is a side elevational view of the brush arm shown in FIG. 1(A) thereof.
Figure 1C:
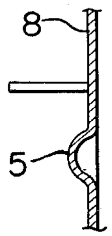
FIG. 1(C) is an enlarged sectional side view of the main part of the brush arm shown in FIG. 1(A)

Reference is first made to FIGS. 1(A), 1(B) and 1(C) which show a brush arm according to a preferred embodiment of the present invention.

Reference numeral 1 generally designates a brush arm, which is composed of a brush 2, a brush support 3, and a brush arm base 4 having a first ridge section 5, recesses 6 and 7, and a terminal section 8. The brush arm 1, composed mainly of the brush support 3 and the brush arm base 4, is made of conductive and resilient material, such as BeCu. The brush 2 is provided at the tip of the brush support 3, and is adapted to be held opposite to and in contact with a motor commutator (not shown). The brush arm base 4 is connected to the brush support 3 so that they form the letter T. The brush arm base 4 has, at its right and left upper edges, that are bent portions 4' and 4' bent substantially at right angles thereto. The first ridge section 5 is formed in the vicinity of the center of the brush arm base 4. The recesses 6 and 7 are provided at the side edges of the brush arm base 4. The terminal section 8 is provided on the top of the brush arm base 4. A lead wire (not shown) is adapted to be connected to the terminal section 8.

Figure 2B:
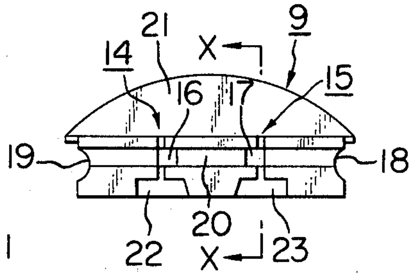
FIG. 2(B) is an end elevational view of the brush arm mount shown in FIG. 2(A)
Figure 2A:
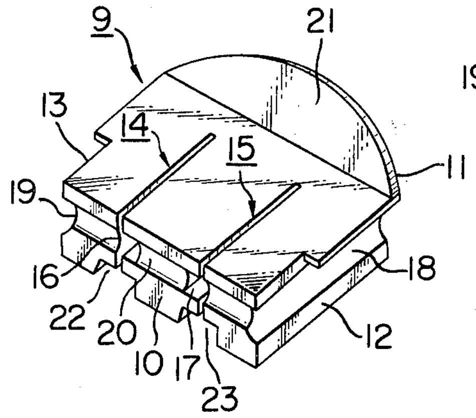
FIG. 2(A) is a perspective view of a brush arm mount according to a preferred embodiment of the present invention.
Figure 2C:
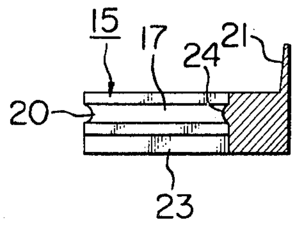
FIG. 2(C) is a sectional side elevational view of the brush arm shown in FIG. 2(A) taken along line X—X in FIG. 2(B)

Reference is now made to FIGS. 2(A), 2(B) and 2(C), which show a brush arm mount according to a preferred embodiment of the present invention.

Reference numeral 9 generally designates a brush arm mount made of an insulating material, such as polyacetal. Reference numeral 10 designates the front edge portion of the brush arm mount 9, reference numeral designates 11 the rear edge portion thereof and reference numerals 12 and 13 designate the side edge portions thereof, respectively. Reference numerals 14 and 15 generally designate slits provided in the brush arm mount 9 and having therein first grooves 16 and 17, respectively. These slits 14 and 15 and first grooves 16 and 17 are adapted to receive the brush arm base 4 and the first ridge section 5, respectively, shown in FIGS. 1(A) to 1(C). Reference numerals 18 and 19 designate second grooves provided on the side edges of the brush arm mount 9. Reference numeral 20 designates a third groove provided on the front edge of the brush arm mount 9 and having a cross-sectional shape corresponding to the shape of the recesses 6 or 7 shown in FIG. 1(A). Reference numeral 21 designates a plate member projecting from the rear edge of the brush arm mount 9. Relief grooves 22 and 23 are provided on the bottom of the brush arm mount 9 for preventing the brush support 3 from inadvertently coming into contact with the brush arm mount 9. Projections 24 are provided in the slits 14 and 15, corresponding in cross section to the recesses 6 and 7 shown in FIG. 1(A), respectively.

Figure 3A:
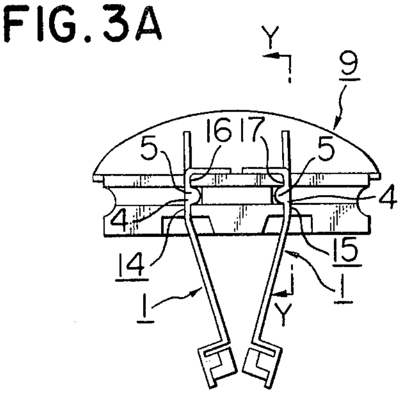
FIG. 3(A) is an elevational view illustrating two brush arms and a brush-arm mount of the present invention as they appear when assembled.
Figure 3B:
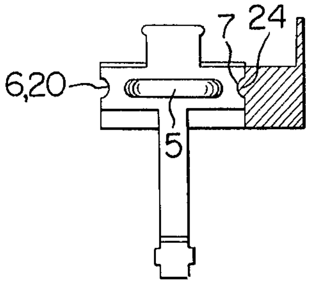
FIG. 3(B) is a sectional side elevational view thereof taken along line Y—Y in FIG. 3(A)

In mounting the brush arm 1 shown in FIGS. 1(A) to 1(C) on the brush arm mount 9 shown in FIG. 2(A) to FIG. 2(C), the brush arm 1 is pushed into the slit 14 or 15 until the side edge surface (where the recess 6 or 7 is provided) of the brush arm base 4 engages one of the projections 24 (see FIG. 3(B)).

FIGS. 3(A) and 3(B) illustrate the brush arms 1 and the brush arm mount 9 as they appear when they have been assembled together in the above-mentioned manner.

Reference is now made to FIGS. 3(A) and 3(B), in which the reference numerals designate corresponding parts shown in FIGS. 1(A) to 1(C) and 2(A) to 2(C).

The brush arm base 4 of each brush arm 1 is resiliently held in the slit 14 or 15 by the action of the resilience of the ridge section 5. As shown in FIG. 3(B), the brush arm 1 has a positional relationship with the brush arm mount 9 such that one recess 7 of the brush arm 1 is mated with the projection 24 provided in the slit 14 or 15 and the other recess 6 thereof coincides with the third groove 20 of the brush arm mount 9, when assembled.

Figure 4A:
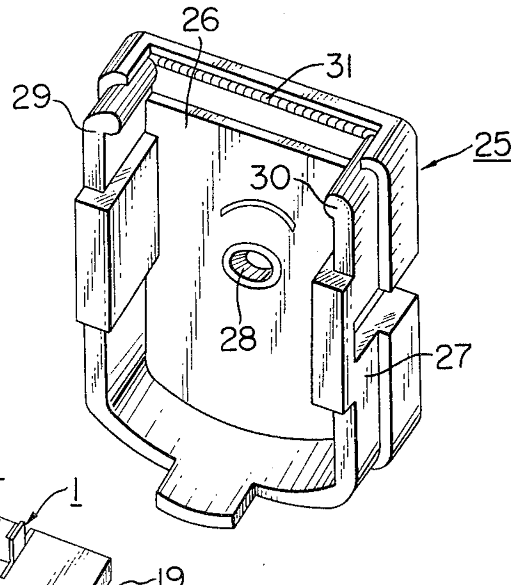
FIGS. 4*a* and 4*b* are exploded perspective view illustrating the relationship between the brush arm mount comprising the present invention and a typical small motor-case.
Figure 4B:
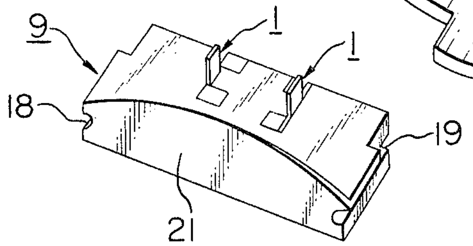

Next, reference is made to FIG. 4, which is an exploded perspective view illustrating the relationship between a small case 25 of the invention and the brush arm mount 9 to which the brush arms are attached.

Reference numeral 25 generally designates a small motorcase to be coupled with a large motor-case (not shown). The small case 25 has a base 26, sides 27, a bearing section 28 for supporting a motor shaft (not shown), second ridge sections 29 and 30 provided thereon in the vicinity of the upper edges of the internal surfaces of the sides 27 respectively, and a third ridge section 31 provided thereon in the vicinity of the upper edge of the internal surface of the base 26. Other reference numerals designate corresponding parts shown in FIGS. 1(A) to 1(C) and 2(A) to 2(C).

In the small case 25 shown in FIG. 4, the second ridge sections 29 and 30 have a cross-sectional shape corresponding to that of the second grooves 18 and 19 of the brush arm mount 9. In addition, the third ridge section 31 has a cross-sectional shape corresponding to that of the groove 20 of the brush arm mount 9.

In attaching the brush arm mount 9 to the small case 25, the brush arm mount 9 to which a pair of brush arms 1 have been attached is pushed into the small case 25 while the second grooves 18 and 19 of the brush arm mount 9 engage the second ridge sections 29 and 30, respectively. When the brush arm mount 9 is attached to the small case 25, the second grooves 18 and 19 are mated with the second ridge sections 29 and 30, and thereby the brush arm mount 9 is elastically held on the small case 25. Also, the third groove 20 of the brush arm mount 9 and the recess 6 or 7 of the brush arm 1 are both mated with the third ridge section 31 of the small case 25. Thus the brush arm mount 9 is firmly held on the small case 25.

According to the brush holder of the present invention, as mentioned above, the brush arms 1 are firmly held on the brush arm mount 9 by the slits 14 and 15 of the brush arm mount 9, the projections 24 thereof, and the third ridge section 31 of the small case 25. In addition, the brush arm mount 9 is firmly held on the small case 25 by the second ridge sections 29 and 30 of the small case 25 and the third ridge section 31 thereof.

According to the present invention, the brush arm 1 is very simple in shape as clearly shown in FIGS. 1(A) to 1(C) and therefore is very easy to form.

According to the present invention, the plate member 21 is provided on the brush arm mount 9. Therefore, in attaching the brush arm mount 9 to the small case 25, the brush arm mount 9 may be pushed by applying, for instance, the inner surface of a thumb to the plate member 21. Thus the mounting operation becomes very easy.

According to the present invention, if the brush arm mount 9 is mounted on the small case 25 when the brush arm 1 is incompletely inserted in the brush arm mount 9, the brush arm 1, after reaching the third ridge section 31, is further inserted into the slit 14 or 15 of the brush arm mount 9 by the action of the third ridge section 31 to reach the proper position. Thus, on completion of this mounting operation, the brush arm 1 is properly positioned with respect to the brush arm mount 9. Consequently, the assembly of the brush holder of the present invention becomes very easy to perform and the brush arm 1 can be correctly held in position.

Having described the preferred embodiments of the invention, it is to be distinctly understood that the invention is not limited thereto but may be otherwise variously embodied without departing from the spirit of the invention.

What is claimed is:

1. A brush holder for holding a brush opposite to and in contact with a motor commutator, which comprises: a brush arm made of conductive and resilient material and including a brush support having a brush at its tip and a brush arm base having a first ridge section; an insulating brush arm mount provided with slits extending from a front edge portion thereof, first grooves provided in the vicinity of the central portions of said slits respectively, and second grooves provided along the side edge portions thereof and extending from the front edge portion thereof, said brush arm being removably mounted on said brush arm mount; and a case provided with a base having a bearing section for supporting a motor shaft, and sides having second ridge sections in the vicinity of the upper end portions of the internal surfaces thereof, respectively; wherein said first ridge section of said brush arm is resiliently positioned in said first grooves of said brush arm mount, respectively, to thereby mount said brush arm on said brush arm mount and wherein said second grooves of said brush arm mount are mated with said second ridge sections of said case, respectively, to thereby attach said brush arm mount to said case.

2. The brush holder as set forth in claim 1, further comprising recesses provided at the side edges of said brush arm base respectively, a projection provided in each of said slits and at the rear edge side of said brush arm mount, a third groove provided on the front edge portion of said brush arm mount, and a third ridge section provided in the vicinity of the upper edge of the internal surface of said base, wherein one of said recesses is mated with said projection, and the other of said recesses and said third groove are both mated with said third ridge section.

3. The brush holder as set forth in claim 1, further comprising a plate member provided on the upper rear edge portion of said brush arm mount.

4. The brush holder as set forth in claim 1 wherein said first ridge section is arcuate in transverse cross-section.

5. The brush holder as set forth in claim 1 wherein said second ridge sections and said second grooves are arcuate in transverse cross-section.

6. The brush holder as set forth in claim 2 further comprising a plate member provided on the upper rear edge portion of said brush arm mount.

7. In a brush holder for holding a brush opposite to and in contact with a motor commutator, the brush being mounted in a brush arm made of conductive and resilient material and including a brush support for mounting the brush at the tip thereof and a brush arm base having a first ridge section, the improvement comprising: an insulating brush arm mount having a first edge portion, slits extending from said front edge portion of said brush arm mount, first grooves provided in the vicinity of the central portions of said slits, respectively, and second grooves provided along the side edge portions thereof and extending from the front edge portion thereof, said brush arm being removably mounted on said brush arm mount; and a case provided with a base having a bearing section for supporting a motor shaft, and sides having second ridge sections in the vicinity of the upper end portions of the internal surfaces thereof, respectively; wherein said first ridge section of said brush arm is resiliently positioned in said first grooves of said brush arm mount, respectively, to thereby mount said brush arm on said brush arm mount and wherein said second grooves of said brush arm mount are mated with said second ridge sections of said case, respectively, to thereby attach said brush arm mount to said case.

8. The brush holder as set forth in claim 7, further including recesses provided at the side edges of said brush arm base, respectively, and wherein said improvement further comprises a projection provided in each of said slits and at the rear edge side of said brush arm mount, a third groove provided on the front edge portion of said brush arm mount, and a third ridge section provided in the vicinity of the upper edge of the internal surface of said base, wherein one of said recesses is adapted to be mated with said projection, and the other of said recesses and said third groove are both adapted to be mated with said third ridge section.

9. The brush holder as set forth in claim 7 further comprising a plate member provided on the upper rear edge portion of said brush arm mount.

10. The brush holder as set forth in claim 7 wherein said first ridge section is arcuate in transverse cross-section.

11. The brush holder as set forth in claim 7 wherein said second ridge sections and said second grooves are arcuate in transverse cross-section.

12. The brush holder as set forth in claim 8 wherein said projection, said third ridge and said second groove are arcuate in transverse cross-section.

13. The brush holder as set forth in claim 8 further comprising a plate member provided on the upper rear edge portion of said brush arm mount.

* * * * *